United States Patent
Liu et al.

(10) Patent No.: US 11,709,508 B2
(45) Date of Patent: Jul. 25, 2023

(54) CONTROL METHOD, CONTROL SYSTEM AND ELECTRIC VALVE

(71) Applicant: ZHEJIANG SANHUA INTELLIGENT CONTROLS CO., LTD., Zhejiang (CN)

(72) Inventors: Yang Liu, Zhejiang (CN); Xiaoyan Wu, Zhejiang (CN)

(73) Assignee: ZHEJIANG SANHUA INTELLIGENT CONTROLS CO., LTD., Zhejiang (CN)

( * ) Notice: Subject to any disclaimer, the term of this patent is extended or adjusted under 35 U.S.C. 154(b) by 0 days.

(21) Appl. No.: 17/278,990

(22) PCT Filed: Aug. 10, 2020

(86) PCT No.: PCT/CN2020/108087
§ 371 (c)(1),
(2) Date: Mar. 23, 2021

(87) PCT Pub. No.: WO2021/114698
PCT Pub. Date: Jun. 17, 2021

(65) Prior Publication Data
US 2022/0113747 A1  Apr. 14, 2022

(30) Foreign Application Priority Data

Dec. 11, 2019  (CN) .......................... 201911264982.4

(51) Int. Cl.
*G05D 7/06*  (2006.01)
*G05B 19/43*  (2006.01)
(Continued)

(52) U.S. Cl.
CPC ......... *G05D 7/0623* (2013.01); *F16K 31/046* (2013.01); *F16K 31/0675* (2013.01);
(Continued)

(58) Field of Classification Search
CPC ............... G05D 7/0623; G05D 7/0635; G05B 2219/33326; G05B 2219/45006;
(Continued)

(56) References Cited

U.S. PATENT DOCUMENTS 4,277,832 A * 7/1981 Wong ................... G05D 7/0635
                                                137/487
5,295,429 A * 3/1994 Monk ..................... F15B 11/00
                                                137/635
(Continued)

FOREIGN PATENT DOCUMENTS

CN          1035704 A       9/1989
CN        102607218 A       7/2012
(Continued)

OTHER PUBLICATIONS

International Search Report issued from the International Search Authority to Application No. PCT/CN2020/108087 dated Nov. 12, 2020, 5 pages.
(Continued)

*Primary Examiner* — William M McCalister
(74) *Attorney, Agent, or Firm* — Hunton Andrews Kurth LLP (57) ABSTRACT

Provided are a control method, a control system and an electric valve. The control method includes steps described below. An actually measured setting parameter curve is acquired. A required setting parameter curve is acquired. Both the actually measured setting parameter curve and the required setting parameter curve represent a corresponding relationship between a position of the electric valve and a setting parameter. The actually measured setting parameter curve and the required setting parameter curve are fitted to acquire a position mapping curve. A setting required position is obtained according to a required setting parameter and the required setting parameter curve, and a setting actual
(Continued)

position is acquired according to the setting required position and the position mapping curve. The electric valve is controlled to run toward the setting actual position of the electric valve.

10 Claims, 7 Drawing Sheets (51) Int. Cl.
*F24F 11/64* (2018.01)
*G05B 13/02* (2006.01)
*F16K 1/00* (2006.01)
*F16K 31/04* (2006.01)
*F16K 31/06* (2006.01)
*F25B 49/02* (2006.01)
*F25B 41/35* (2021.01)

(52) U.S. Cl.
CPC ............. *F24F 11/64* (2018.01); *G05B 13/02* (2013.01); *G05B 19/43* (2013.01); *G05D 7/0635* (2013.01); *F16K 1/00* (2013.01); *F16K 31/0655* (2013.01); *F25B 41/35* (2021.01); *F25B 49/02* (2013.01); *F25B 2500/19* (2013.01); *F25B 2600/2513* (2013.01); *G05B 2219/33326* (2013.01); *G05B 2219/45006* (2013.01)

(58) Field of Classification Search
CPC ..... G05B 19/43; G05B 13/02; F25B 2500/19; F25B 2600/2513; F25B 49/02; F25B 41/35; F24F 11/64; F16K 31/046; F16K 31/0655; F16K 31/0675; F16K 1/00
See application file for complete search history.

(56) References Cited

U.S. PATENT DOCUMENTS

| | | | | |
|---|---|---|---|---|
| 6,272,401 B1* | 8/2001 | Boger | ............... | G05B 11/42 700/282 |
| 6,466,893 B1* | 10/2002 | Latwesen | ............... | G05B 23/02 702/41 |
| 6,701,726 B1* | 3/2004 | Kolk | ............... | F25B 49/043 62/476 |
| 7,089,086 B2* | 8/2006 | Schoonover | ....... | G05B 23/0254 700/282 |
| 9,851,725 B2* | 12/2017 | Li | ............... | G05B 15/02 |
| 2005/0000580 A1 | 1/2005 | Tranovich et al. | | |
| 2005/0182524 A1* | 8/2005 | Brodeur | ............... | G01F 1/363 700/282 |
| 2005/0247350 A1* | 11/2005 | Coakley | ............... | G01D 5/145 137/554 |
| 2007/0040138 A1* | 2/2007 | Sekiya | ............... | F16K 11/0743 251/129.11 |
| 2012/0136490 A1* | 5/2012 | Weatherbee | ........... | G01B 7/003 700/282 |
| 2012/0187202 A1 | 7/2012 | Suzuki et al. | | |
| 2014/0131599 A1* | 5/2014 | Golden | ............... | F25B 49/02 251/129.01 |
| 2015/0057816 A1* | 2/2015 | Schick | ............... | G05D 7/0635 700/282 |
| 2016/0169410 A1 | 6/2016 | Wheeler et al. | | |
| 2018/0216982 A1* | 8/2018 | Slot, III | ............... | E21B 33/068 |
| 2019/0018432 A1 | 1/2019 | Petry | | |
| 2019/0064853 A1* | 2/2019 | Momma | ............... | G05D 7/0617 |
| 2020/0081410 A1* | 3/2020 | Walker | ............... | G05B 19/406 |
| 2021/0302053 A1* | 9/2021 | Hua | ............... | G01F 25/15 |

FOREIGN PATENT DOCUMENTS

| | | |
|---|---|---|
| CN | 107002907 A | 8/2017 |
| CN | 107284193 A | 10/2017 |
| CN | 108195447 A | 6/2018 |
| CN | 109240080 A | 1/2019 |
| CN | 109918729 A | 6/2019 |
| CN | 110277939 A | 9/2019 |
| JP | 2008202911 A | 9/2008 |
| JP | 2016200198 A | 12/2016 |
| JP | 2016205484 A | 12/2016 |
| JP | 2019510190 A | 4/2019 |
| WO | 2012127860 A1 | 9/2012 |

OTHER PUBLICATIONS

Japanese Office Action, from the Japan Patent Office, issued to JP Application No. 2021-512806, dated Apr. 5, 2022, 6 pages.
Chinese Office Action, The State Intellectual Property Office of People's Republic of China, issued to CN Application No. 201911264982.4 dated Sep. 20, 2022, 6 pages.
Extended European Search Report issued from the European Patent Office to EP Application No. 20855848.6 dated Aug. 19, 2022, 10 pages.

\* cited by examiner

CONTROL METHOD, CONTROL SYSTEM AND ELECTRIC VALVE

CROSS-REFERENCE TO RELATED APPLICATIONS

This application is a 35 U.S.C. § 371 United States national stage application of International Patent Application No. PCT/CN2020/108087, filed on Aug. 10, 2020, which claims priority to Chinese patent application No. 201911264982.4 filed on Dec. 11, 2019, disclosures of which are incorporated herein by reference in their entireties.

The present application claims priority to Chinese patent application No. 201911264982.4 filed on Dec. 11, 2019, disclosure of which is incorporated herein by reference in its entirety.

TECHNICAL FIELD

Embodiments of the present application relate to the control field, for example, a control method, a control system and an electric valve.

BACKGROUND

An electric valve typically includes a controller, a stepping motor and a spool. The controller transmits a driving signal to the stepping motor so as to control the stepping motor to rotate, and the stepping motor drives the spool of the electric valve to move relative to a valve port so as to cause the valve port to reach a corresponding opening degree. The electric valve, for example, may be an electronic expansion valve, and a flow rate of a working medium can be adjusted by adjusting a position of the spool in the electronic expansion valve.

In a process of controlling operation of the electric valve, there will be a situation that a corresponding relationship between a position of the electric valve required by a user and a flow rate is inconsistent with a corresponding relationship between an actual position of the electric valve and the flow rate. At present, according to a principle that a total stroke of the electric valve is consistent, the position of the electric valve required by the user is in one-to-one correspondence with the actual position of the electric valve. However, a curve obtained by this method and illustrating a relationship between a required position of the electric valve and the flow rate has a large difference with a curve illustrating a relationship between the actual position of the electric valve and the flow rate. When the electric valve is controlled to run to a corresponding actual position according to the position of the electric valve required by the user, a flow rate corresponding to the electric valve cannot satisfy a requirement of the user for the flow rate of the electric valve, and there is a great deviation in the accuracy of flow rate control, that is, the flow rate of the electric valve cannot be accurately controlled.

SUMMARY

Embodiments of the present application provide a control method, a control system and an electric valve, which avoids a situation that the control accuracy of a setting parameter has a large deviation, thus improving the accuracy of a control process of the electric valve.

In a first aspect, an embodiment of the present application provides a control method for controlling an electric valve, and the control method includes steps described below.

An actually measured setting parameter curve is acquired.

A required setting parameter curve is acquired. Both the actually measured setting parameter curve and the required setting parameter curve include a corresponding relationship between a position of the electric valve and a setting parameter.

The actually measured setting parameter curve and the required setting parameter curve are fitted to acquire a position mapping curve. The position mapping curve represents a corresponding relationship between an actual position of the electric valve and a required position of the electric valve, and a difference value between a setting parameter corresponding to an abscissa of each coordinate point on the position mapping curve and a setting parameter corresponding to an ordinate of the each coordinate point on the position mapping curve is less than a setting difference value.

A setting required position is obtained according to a required setting parameter and the required setting parameter curve, and a setting actual position is acquired according to the setting required position and the position mapping curve.

The electric valve is controlled to run toward the setting actual position of the electric valve.

In a second aspect, an embodiment of the present application further provides a control method for controlling an electric valve, and the control method includes steps described below.

A setting required position is obtained according to a required setting parameter and a required setting parameter curve, and a setting actual position is acquired according to the setting required position and a position mapping curve.

The electric valve is controlled to run toward the setting actual position of the electric valve.

The position mapping curve is pre-stored in a control system used for controlling running of the electric valve, the position mapping curve varies with an actually measured setting parameter curve and the required setting parameter curve, and both the actually measured setting parameter curve and the required setting parameter curve represent a corresponding relationship between a position of the electric valve and a setting parameter.

The position mapping curve is obtained by fitting the actually measured setting parameter curve and the required setting parameter curve, and a difference value between the setting parameter corresponding to an abscissa of a point on the position mapping curve and the setting parameter corresponding to an ordinate of the point on the position mapping curve is less than a setting difference value.

In a third aspect, an embodiment of the present application further provides a control system for controlling an electric valve, and the control system includes an actual curve acquisition module, a required curve acquisition module, a fitting module, an actual position acquisition module, and an electric valve control module.

The actual curve acquisition module is configured to acquire an actually measured setting parameter curve.

The required curve acquisition module is configured to acquire a required setting parameter curve. Both the actually measured setting parameter curve and the required setting parameter curve represent a corresponding relationship between a position of the electric valve and a setting parameter.

The fitting module is configured to fit the actually measured setting parameter curve and the required setting parameter curve to acquire a position mapping curve. The position mapping curve represents a corresponding relationship between an actual position of the electric valve and a required position of the electric valve, and a difference value between a setting parameter corresponding to an abscissa of each coordinate point on the position mapping curve and a setting parameter corresponding to an ordinate of the each coordinate point on the position mapping curve is less than a setting difference value.

The actual position acquisition module is configured to obtain a setting required position according to a required setting parameter and the required setting parameter curve, and acquire a setting actual position according to the setting required position and the position mapping curve.

The electric valve control module is configured to control the electric valve to run toward the setting actual position of the electric valve.

In a fourth aspect, an embodiment of the present application further provides a control system for controlling an electric valve, and the control system includes an actual position acquisition module, an electric valve control module and a storage module.

The actual position acquisition module is configured to obtain a setting required position according to a required setting parameter and a required setting parameter curve, and acquire a setting actual position according to the setting required position and a position mapping curve.

The electric valve control module is configured to control the electric valve to run toward the setting actual position of the electric valve.

The storage module is configured to store the position mapping curve. The position mapping curve is configured to vary with an actually measured setting parameter curve and the required setting parameter curve, and both the actually measured setting parameter curve and the required setting parameter curve represent a corresponding relationship between a position of the electric valve and a setting parameter. The position mapping curve is configured to be obtained by fitting the actually measured setting parameter curve and the required setting parameter curve, and a difference value between a setting parameter corresponding to an abscissa of a point on the position mapping curve and a setting parameter corresponding to an ordinate of the point on the position mapping curve is less than a setting difference value.

In a fifth aspect, an embodiment of the present application further provides an electric valve, and the electric valve includes a stator assembly, a rotor assembly, a spool and a circuit board assembly. The stator assembly includes a coil, the rotor assembly includes a permanent magnet, the coil is electrically connected to the circuit board assembly, the coil is configured to generate an excitation magnetic field after being energized, the rotor assembly is configured to rotate in the excitation magnetic field, a position of the spool is a position of the electric valve, and the circuit board assembly is integrated with the control system of the third aspect or the fourth aspect.

DETAILED DESCRIPTION

Figure 1:
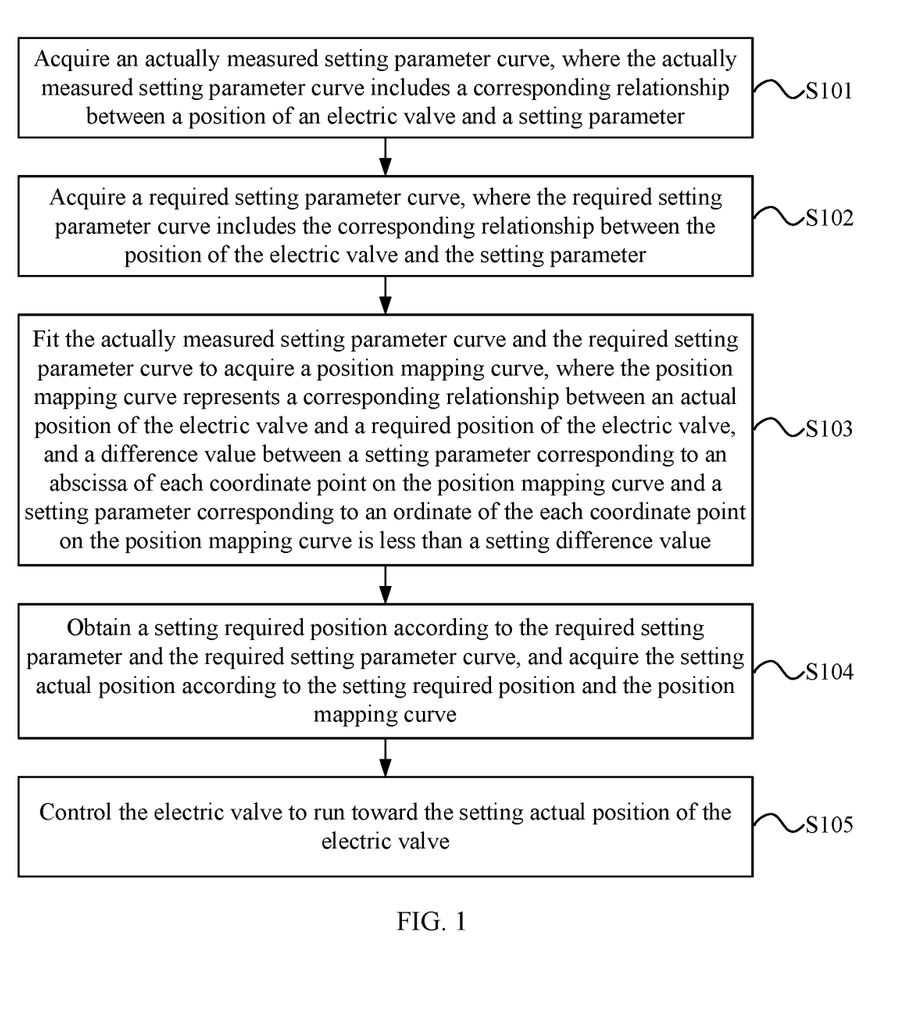
FIG. 1 is a flowchart of a first control method according to an embodiment of the present application.

FIG. 1 is a flowchart of a first control method according to an embodiment of the present application. The control method may be applied to a scene where an electric valve needs to be controlled, the control method may be executed by a control system of the electric valve, and the control system may execute the control method by software and/or hardware. As shown in FIG. 1, the control method includes step S101 to step S105.

In step S101, an actually measured setting parameter curve is acquired. The actually measured setting parameter curve includes a corresponding relationship between a position of the electric valve and a setting parameter.

The actually measured setting parameter curve is acquired. The actually measured setting parameter curve includes the corresponding relationship between the position of the electric valve and the setting parameter. In an embodiment, the electric valve may include an electronic expansion valve, and the electronic expansion valve includes a spool. The setting parameter may include a flow rate, and the actually measured setting parameter curve includes a corresponding relationship between a position of the spool and the flow rate.

In an embodiment, the electronic expansion valve may further include a motor, such as a stepping motor. And the electronic expansion valve further includes a controller, the controller transmits a driving signal to the stepping motor so as to control the stepping motor to rotate, and the stepping motor drives the spool of the electric valve to move relative to a valve port so as to cause the valve port to reach a corresponding opening degree. The position of the electric valve may be understood as the position of the spool of the electric valve, and the position of the spool of the electric valve, an opening area of the valve port of the electric valve and a microstep number (that is, a microstep value) of the stepping motor have a linear relationship with each other. Therefore, the position of the electric valve may be represented by the microstep number of the stepping motor in the electric valve. Therefore, the actually measured setting parameter curve may further include a corresponding relationship between the microstep value of the motor and the flow rate, and the electronic expansion valve can run towards a setting actual position by adjusting the microstep value of the motor.

Figure 2:
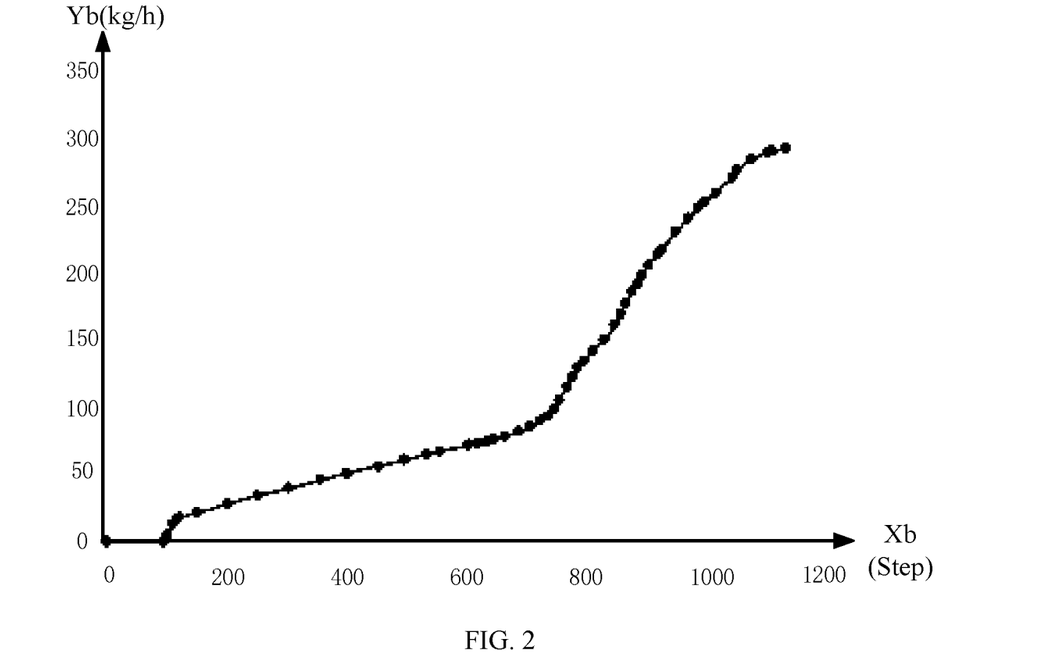
FIG. 2 is a schematic diagram of an actually measured setting parameter curve according to an embodiment of the present application.

FIG. 2 is a schematic diagram of an actually measured setting parameter curve according to an embodiment of the present application. In FIG. 2, the abscissa represents an actual microstep number Xb of the stepping motor, and the ordinate represents the setting parameter Yb. The setting parameter may be, for example, the flow rate, and the microstep number of the stepping motor may represent the position of the electric valve. Therefore, the curve shown in FIG. 2 can represent the actually measured setting parameter curve, and the actually measured setting parameter curve includes the corresponding relationship between the position of the electric valve and the setting parameter. The following Table 1 may be obtained from FIG. 2.

TABLE 1

A corresponding relationship between an actual position of the electric valve and the setting parameter

| Xb (Step) | Yb (kg/h) |
|---|---|
| 0 | 0.00 |
| 95 | 0.00 |
| 101 | 5.00 |
| 109 | 11.76 |
| 115 | 15.60 |
| 138 | 20.26 |
| 184 | 26.21 |
| 218 | 30.38 |
| 276 | 37.03 |
| 345 | 44.77 |
| 426 | 53.85 |
| 645 | 77.02 |
| 668 | 79.96 |
| 714 | 88.85 |
| 748 | 104.23 |
| 760 | 114.18 |
| 835 | 157.99 |
| 921 | 219.27 |
| 1124 | 294.00 |
| 1152 | 300.00 |

In step S102, a required setting parameter curve is acquired. The required setting parameter curve represents the corresponding relationship between the position of the electric valve and the setting parameter.

The required setting parameter curve is acquired. The required setting parameter curve also represents the corresponding relationship between the position of the electric valve and the setting parameter. In an embodiment, the electric valve may include the electronic expansion valve, and the electronic expansion valve includes the spool. The setting parameter may include the flow rate, and the required setting parameter curve represents the corresponding relationship between the position of the spool and the flow rate. In an embodiment, referring to the description of step S101, the required setting parameter curve may further represent the corresponding relationship between the microstep value of the motor and the flow rate, and the electronic expansion valve can run towards the setting actual position by adjusting the microstep value of the motor.

Figure 3:
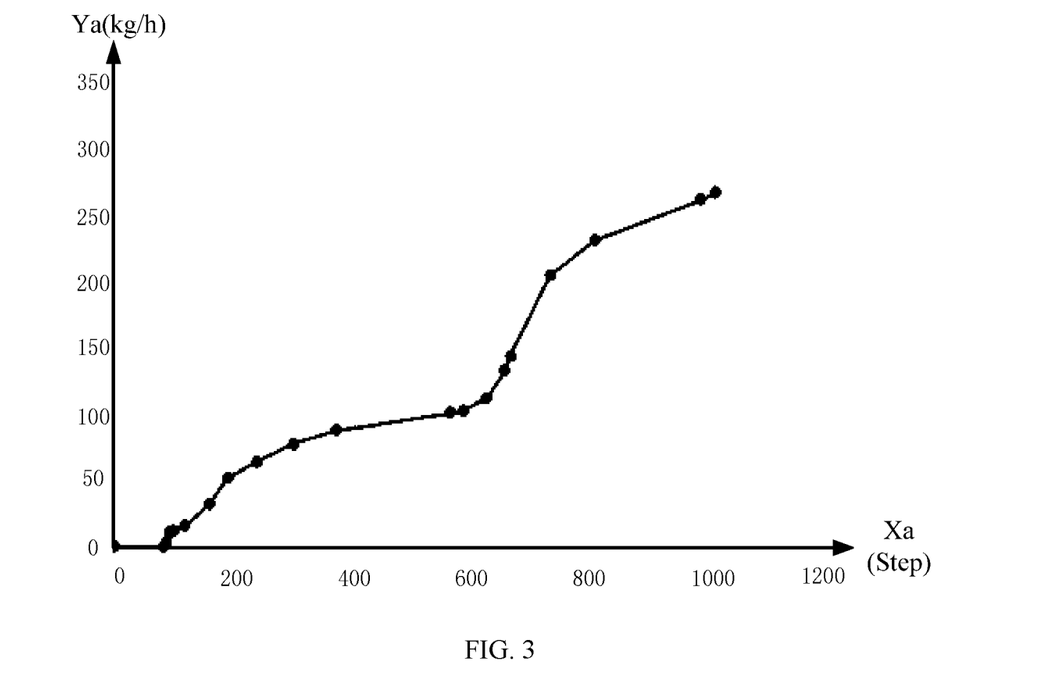
FIG. 3 is a schematic diagram of a required setting parameter curve according to an embodiment of the present application.

FIG. 3 is a schematic diagram of a required setting parameter curve according to an embodiment of the present application. In FIG. 3, the abscissa represents a required microstep number Xa of the stepping motor, and the ordinate represents the setting parameter Ya. The setting parameter may be, for example, the flow rate, and the microstep number of the stepping motor may represent the position of the electric valve. Therefore, the curve shown in FIG. 3 can represent the required setting parameter curve, and the required setting parameter curve represents the corresponding relationship between the position of the electric valve and the setting parameter. The following Table 2 may be obtained from FIG. 3. A required position of the electric valve, that is, a target position where the user wants the electric valve to rotate, corresponds to a setting parameter required by the user, such as the flow rate.

TABLE 2

A corresponding relationship between the required position of the electric valve and the setting parameter

| Xa (Step) | Ya (kg/h) |
|---|---|
| 0 | 0 |
| 82 | 0 |
| 88 | 5 |
| 95 | 12.6 |
| 100 | 14.2 |
| 120 | 18 |
| 160 | 36 |
| 190 | 58 |
| 240 | 72 |
| 300 | 87 |
| 370 | 98 |
| 560 | 113 |
| 580 | 115 |
| 620 | 126 |
| 650 | 149 |
| 660 | 162 |
| 725 | 230 |
| 800 | 260 |
| 976 | 294 |
| 1000 | 300 |

In step S103, the actually measured setting parameter curve and the required setting parameter curve are fitted to acquire a position mapping curve. The position mapping curve represents a corresponding relationship between an actual position of the electric valve and a required position of the electric valve, and a difference value between a setting parameter corresponding to an abscissa of each coordinate point on the position mapping curve and a setting parameter corresponding to an ordinate of the each coordinate point on the position mapping curve is less than a setting difference value.

Figure 4:
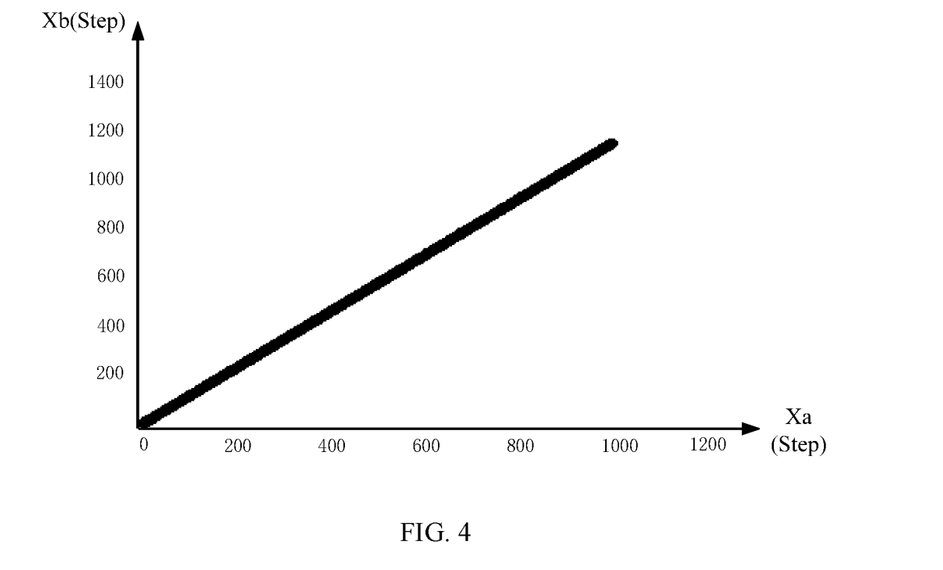
FIG. 4 is a schematic diagram of a curve obtained according to a principle that a total stroke of the electric valve is consistent and illustrating a relationship between a required position of the electric valve and an actual position of the electric valve in the related art.

In the related art, according to the principle that the total stroke of the electric valve is consistent, the required position of the electric valve is in one-to-one correspondence with the actual position of the electric valve. For example, the required position of the electric valve Xa ranges from 0 to 1000 steps, the actual position of the electric valve Xb ranges from 0 to 1152 steps, and the Xb satisfies:

$$Xb = \frac{1152}{1000} \cdot Xa$$

that is, Xa and Xb satisfy the curve shown in FIG. 4. In FIG. 4, the abscissa represents Xa and the ordinate represents Xb, thus achieving one-to-one correspondence between the required position of the electric valve and the actual position of the electric valve, and the following Table 3 can be obtained.

TABLE 3

Data of the flow rate and the position obtained according to the principle that the total stroke of the electric valve is consistent

| Xa (Step) | Ya (kg/h) | Xb (Step) | Yb (kg/h) |
|---|---|---|---|
| 0 | 0 | 0 | 0.00 |
| 82 | 0 | 94 | 0.00 |
| 88 | 5 | 101 | 5.00 |
| 95 | 12.6 | 109 | 11.76 |
| 100 | 14.2 | 115 | 15.60 |
| 120 | 18 | 138 | 20.26 |
| 160 | 36 | 184 | 26.21 |
| 190 | 58 | 218 | 30.38 |
| 240 | 72 | 276 | 37.03 |
| 300 | 87 | 345 | 44.77 |
| 370 | 98 | 426 | 53.85 |
| 560 | 113 | 645 | 77.02 |
| 580 | 115 | 668 | 79.96 |
| 620 | 126 | 714 | 88.85 |
| 650 | 149 | 748 | 104.23 |
| 660 | 162 | 760 | 114.18 |
| 725 | 230 | 835 | 157.99 |
| 800 | 260 | 921 | 219.27 |
| 976 | 294 | 1124 | 294.00 |
| 1000 | 300 | 1152 | 300.00 |

Figure 5:
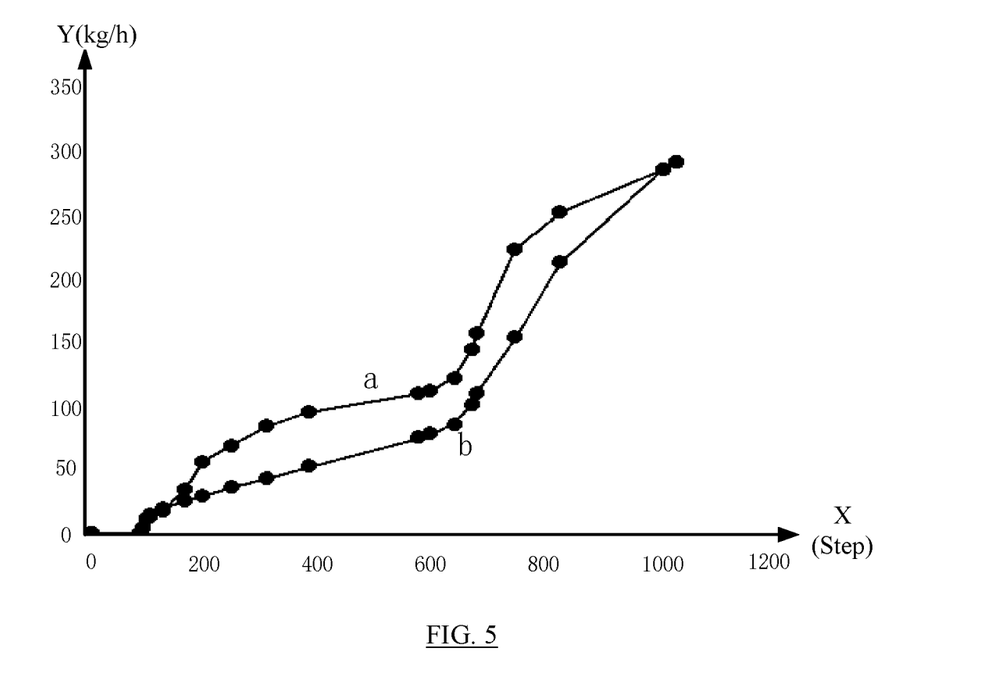
FIG. 5 is a schematic diagram of curves obtained according to a principle that a total stroke of the electric valve is consistent and separately illustrating a relationship between a required position of the electric valve and a setting parameter and a relationship between an actual position of the electric valve and a setting parameter in the related art.

In Table 3, data in the second column shows the flow rate Ya corresponding to the required position of the electric valve Xa, data in the fourth column shows the flow rate Yb corresponding to the actual position of the electric valve Xb, and curves in FIG. 5 can be obtained from Table 3. In FIG. 5, the abscissa represents the position of the spool X and has a unit of step, and the ordinate represents the flow rate Y and has a unit of kg/h. The curve a represents the corresponding relationship between the required position of the electric valve Xa and the flow rate Ya, and the curve b represents the corresponding relationship between the actual position of the electric valve Xb and the flow rate Yb. As can be seen from FIG. 5, the electric valve is controlled according to the principle that the total stroke of the electric valve is consistent, a method that the required position of the electric valve is in one-to-one correspondence with the actual position of the electric valve is adopted, and the obtained curve a and the obtained curve b have a great difference in the flow rate excluding a fully open position and a fully closed position. In other words, when the electric valve is controlled to run to a corresponding actual position according to the required position of the electric valve, the corresponding flow rate of the electric valve cannot satisfy a requirement of the user for the flow rate of the electric valve, and there is a great deviation in the accuracy of flow rate control, that is, the flow rate of the electric valve cannot be accurately controlled.

In this embodiment of the present application, the position mapping curve represents the corresponding relationship between the actual position of the electric valve and the required position of the electric valve. In the step of fitting the actually measured setting parameter curve and the required setting parameter curve to acquire the position mapping curve, firstly, a coordinate point actual position of the electric valve corresponding to a coordinate point setting parameter on the actually measured setting parameter curve may be acquired according to the actually measured setting parameter curve and the coordinate point setting parameter. The setting parameter, for example, may be the flow rate, the coordinate point setting parameter, for example, may be 0, and an abscissa of a point having a ordinate of 0 on the actually measured setting parameter curve shown in FIG. 2 is 95, that is, an actual flow rate corresponding to 95 steps rotated by the stepping motor in the electric valve is 0, and 95 is determined to be the coordinate point actual position of the electric valve.

Then, a coordinate point required position of the electric valve corresponding to a coordinate point setting parameter on the required setting parameter curve may be acquired according to the required setting parameter and the coordinate point setting parameter. The setting parameter, for example, may be the flow rate, the coordinate point setting parameter, for example, may be 0, and an abscissa of a point having a ordinate of 0 on the required setting parameter curve shown in FIG. 3 is 82, that is, when the setting parameter required by the user, such as the flow rate, is 0, theoretically, the stepping motor in the electric valve needs to rotate 82 steps, and 82 is determined to be the coordinate point required position of the electric valve.

Figure 6:
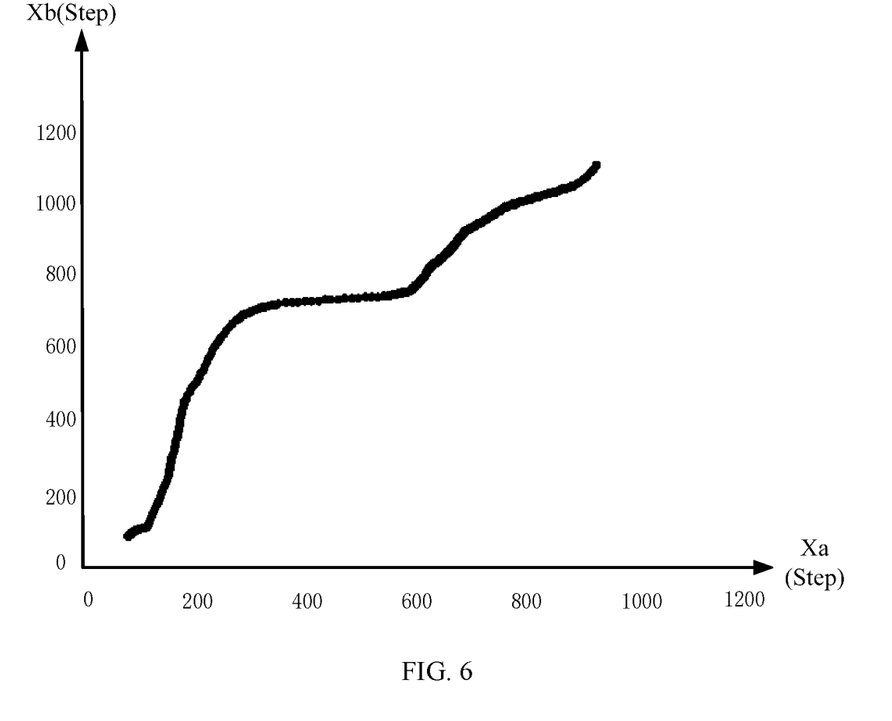
FIG. 6 is a schematic diagram of a position mapping curve according to an embodiment of the present application.

Finally, the coordinate point actual position corresponding to a same coordinate point setting parameter is taken as an ordinate, and the coordinate point required position corresponding to the same coordinate point setting parameter is taken as an abscissa, such that a coordinate point is formed. Coordinate points corresponding to different coordinate point setting parameters are smoothly connected to form the position mapping curve. Table 4 shows a forming process of the above-mentioned different coordinate points. FIG. 6 is a schematic diagram of a position mapping curve according to an embodiment of the present application.

TABLE 4

A forming process of different coordinate points on the position mapping curve

| Y (kg/h) | Xa (Step) | Xb (Step) |
|---|---|---|
| 0 | 82.00 | 95.00 |
| 1 | 83.20 | 96.20 |
| 2 | 84.40 | 97.40 |
| 3 | 85.60 | 98.60 |
| 4 | 86.80 | 99.80 |
| 5 | 88.00 | 101.00 |
| 6 | 88.92 | 102.81 |
| 7 | 89.84 | 103.37 |
| 8 | 90.76 | 104.55 |
| 9 | 91.68 | 105.74 |
| 10 | 92.61 | 106.92 |
| 11 | 93.53 | 108.11 |
| 12 | 94.45 | 109.92 |
| 13 | 96.25 | 110.67 |
| 14 | 99.38 | 112.33 |
| 15 | 104.21 | 114.00 |
| 16 | 109.47 | 115.87 |
| 17 | 114.74 | 118.03 |
| 18 | 120.00 | 120.69 |
| 19 | 122.22 | 128.36 |
| 20 | 124.44 | 136.04 |
| 21 | 126.67 | 143.71 |
| 22 | 128.89 | 151.39 |
| 23 | 131.11 | 159.13 |
| 24 | 133.33 | 166.87 |

Referring to Table 4, the coordinate point setting parameter, such as the flow rate, may be set to gradually increase with variable 1. According to the curve shown in FIG. 2 and the curve shown in FIG. 3, the actual position of the electric valve corresponding to each coordinate point setting parameter is taken as the coordinate point actual position, and the required position of the electric valve corresponding to the each coordinate point setting parameter is taken as the coordinate point required position. In other words, the actual position of the electric valve Xb and the required position of the electric valve Xa corresponding to the same coordinate point setting parameter, that is, the same flow rate, are founded to achieve the fitting of the actually measured setting parameter curve and the required setting parameter curve, so as to form a fitting curve shown in FIG. 6, that is, the position mapping curve.

As can be seen from Table 4 and FIG. 6, the abscissa and the ordinate of each coordinate point on the position mapping curve correspond to a same setting parameter. In other words, the abscissa and the ordinate of the coordinate point on the position mapping curve, that is, the required position of the electric valve and the actual position of the electric valve, correspond to a same flow rate. That is to say, a difference value between the setting parameter corresponding to the abscissa of each coordinate point on the position mapping curve and the setting parameter corresponding to the ordinate of the each coordinate point on the position mapping curve is less than the setting difference value, where the setting difference value is equal to 0.

In step S104, a setting required position is obtained according to the required setting parameter and the required setting parameter curve, and the setting actual position is acquired according to the setting required position and the position mapping curve.

The setting required position is obtained according to the required setting parameter and the required setting parameter curve. In an embodiment, the required setting parameter, that is, the flow rate required by the user, is Ya', a corresponding abscissa Xa' of a coordinate point having an ordinate Ya' is acquired according to the required setting parameter curve shown in FIG. 3, and Xa' is the setting required position, that is, in an ideal state, if the user wants to obtain the flow rate of Ya', the user needs to control the stepping motor to rotate a number Xa' of steps.

The setting actual position is acquired according to the setting required position and the position mapping curve. The setting required position is Xa', a corresponding ordinate Xb' of a coordinate point having an abscissa Xa' is acquired according to the position mapping curve shown in FIG. 6, and Xb' is the setting actual position.

In step S105, the electric valve is controlled to run toward the setting actual position of the electric valve.

The electric valve is controlled to run toward the acquired setting actual position. Since the abscissa and the ordinate of each coordinate point on the position mapping curve correspond to the same setting parameter. In other words, the abscissa and the ordinate of the coordinate point on the position mapping curve shown in FIG. 6, that is, the required position of the electric valve and the actual position of the electric valve, correspond to the same flow rat. The flow rate required by the user is Ya', the setting actual position acquired by step S104 is Xb', that is, a situation that the stepping motor is controlled to actually rotate a number Xb' of steps and a situation the stepping motor rotates a number Xa' of steps in the ideal state both correspond to the flow rate of Ya'. The flow rate of the electric valve can reach the flow rate Ya' required by the user by controlling the electric valve to run to the setting actual position. In this way, a difference between the flow rate corresponding to the actual position of the electric valve and the flow rate corresponding to the required position of the electric valve is eliminated. As long as the electric valve is controlled to run to the setting actual position, the flow rate required by the customer can be accurately acquired, thus greatly improving the accuracy of flow rate control of the electric valve.

Figure 7:
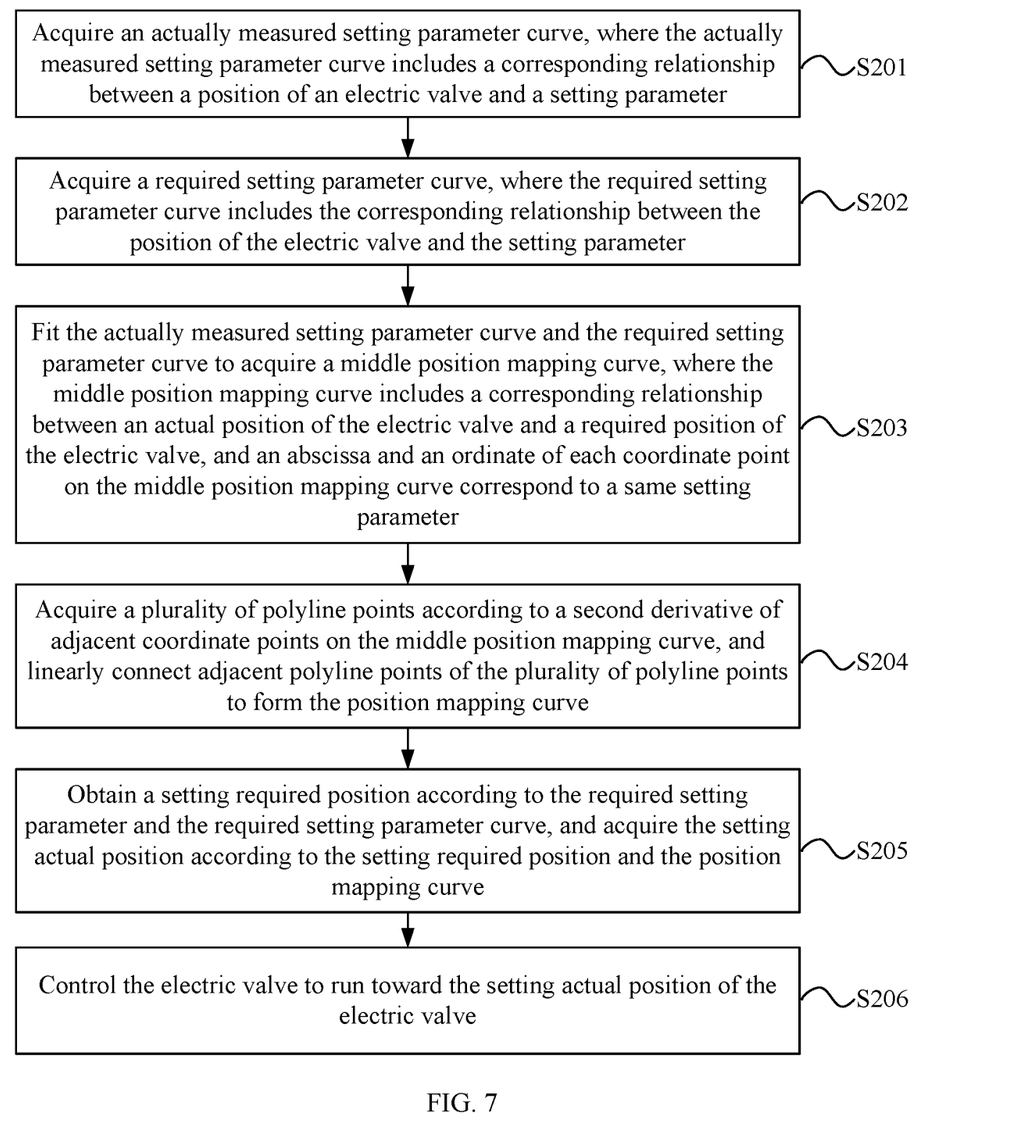
FIG. 7 is a flowchart of a second control method according to an embodiment of the present application.

FIG. 7 is a flowchart of a second control method according to an embodiment of the present application. In contrast to the control method shown in FIG. 1, the step of fitting the actually measured setting parameter curve and the required setting parameter curve to acquire the position mapping curve includes steps described below. The actually measured setting parameter curve and the required setting parameter curve are fitted to acquire a middle position mapping curve, where, the middle position mapping curve represents a corresponding relationship between the actual position of the electric valve and the required position of the electric valve, and an abscissa and an ordinate of each coordinate point on the middle position mapping curve correspond to a same setting parameter. A plurality of polyline points are acquired according to a second derivative of adjacent coordinate points on the middle position mapping curve, and adjacent polyline points of the plurality of polyline points are linearly connected to form the position mapping curve. As shown in FIG. 7, the control method includes step S201 to step S206.

In step S201, an actually measured setting parameter curve is acquired. The actually measured setting parameter curve includes a corresponding relationship between a position of the electric valve and a setting parameter.

In step S202, a required setting parameter curve is acquired. The required setting parameter curve includes the corresponding relationship between the position of the electric valve and the setting parameter.

In step S203, the actually measured setting parameter curve and the required setting parameter curve are fitted to acquire a middle position mapping curve. The middle position mapping curve represents a corresponding relationship between an actual position of the electric valve and a required position of the electric valve, and an abscissa and an ordinate of each coordinate point on the middle position mapping curve correspond to a same setting parameter.

The middle position mapping curve represents the corresponding relationship between the actual position of the electric valve and the required position of the electric valve, and the actually measured setting parameter curve and the required setting parameter curve are fitted to acquire the middle position mapping curve. A process of acquiring the middle position mapping curve is similar to the process of acquiring the position mapping curve described in the above-mentioned step S103, so the process will not be repeated herein. That is to say, the curve shown in FIG. 6 is equivalent to the middle position mapping curve for acquiring the position mapping curve, rather than a final position mapping curve. As can be seen from Table 4 and FIG. 6, the abscissa and the ordinate of each coordinate point on the middle position mapping curve correspond to the same setting parameter.

In step S204, a plurality of polyline points are acquired according to a second derivative of adjacent coordinate points on the middle position mapping curve, and adjacent polyline points of the plurality of polyline points are linearly connected to form the position mapping curve.

A second derivative of a latter coordinate point of every two adjacent coordinate points on the middle position mapping curve shown in FIG. 6 is calculated, and a coordinate point where an absolute value of a second derivative of coordinate point is greater than a setting value is screened out and taken as a polyline point. In an embodiment, a coordinate of each coordinate point on the middle position mapping curve is acquired according to Table 4 or FIG. 6, a first derivative of a latter coordinate point of every two adjacent coordinate points is calculated, and then the second derivative of the latter coordinate point is calculated and acquired according to the first derivative. The second derivative can determine the concavity and convexity of the curve, so the polyline points on the middle position mapping curve can be determined according to the above-mentioned second derivative.

In an embodiment, every two adjacent coordinates on the middle position mapping curve shown in FIG. 6 may be set as $(X_{a1}, X_{b1})$ and $(X_{a2}, X_{b2})$, and the first derivative $Dxa_2'$ of the latter coordinate point $(X_{a2}, X_{b2})$ may be obtained according to the following formula:

$$Dxa_2' = \frac{X_{b2} - X_{b1}}{X_{a2} - X_{a1}}$$

The first derivative of each coordinate point on the middle position mapping curve shown in FIG. 6 may be obtained from this method, and the second derivative $Dxa_2''$ of the latter coordinate point $(X_{a2}, X_{b2})$ may be calculated according to $(X_{a1}, Dxa_1')$ and $(X_{a2}, Dxa_2')$.

$$Dxa_2'' \frac{Dxa_2' - Dxa_1'}{X_{a2} - X_{a1}}$$

The point where an absolute value of a second derivative of point is greater than the setting value is screened out according to $Dxa_2''$ and taken as the polyline point. The setting value may be set manually, for example, the setting value may be set to 0.2, that is, a coordinate point $(X_{a2}, X_{b2})$ where a second derivative of coordinate point is greater than 0.2 is screened out as the polyline point, and a coordinate point $(X_{a2}, X_{b2})$ where a second derivative of coordinate point is less than −0.2 is screened out as the polyline point. It is to be noted that the setting value is only exemplarily set to 0.2 herein, which is not intended to limit the setting value. Taking the setting value being 0.2 as an example, and Table 5 shows a required position Xat of the electric valve corresponding to a screened polyline point and an actual position Xbt of the electric valve corresponding to the screened polyline point.

Figure 8:
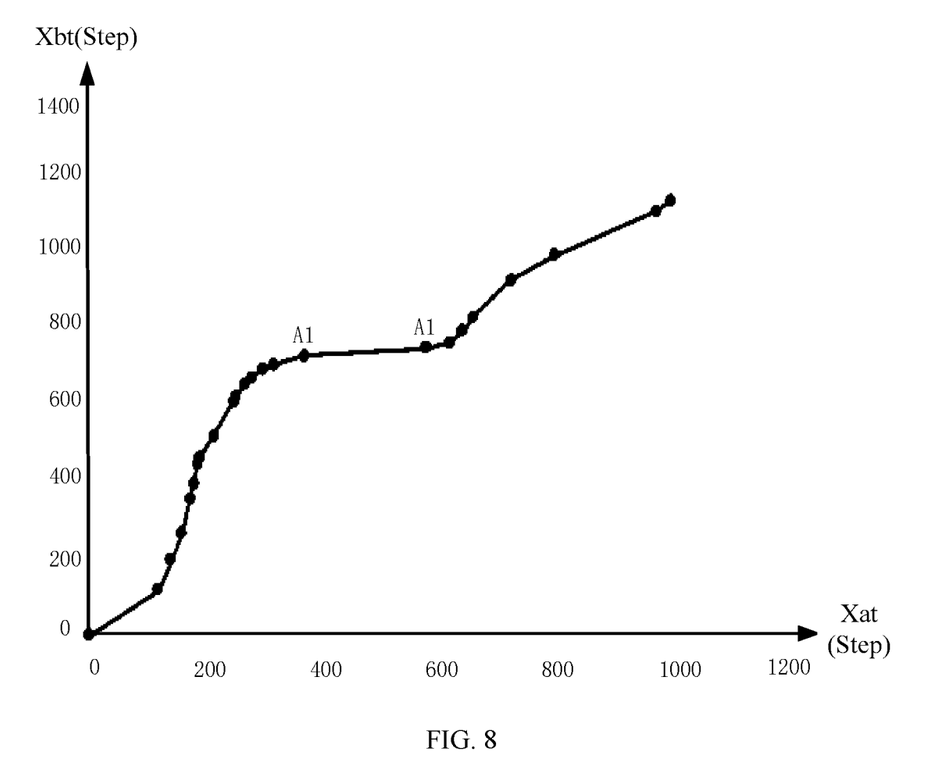
FIG. 8 is a schematic diagram of another position mapping curve according to an embodiment of the present application.

In this way, the plurality of polyline points shown in Table 5 are acquired. FIG. 8 is a schematic diagram of another position mapping curve according to an embodiment of the present application. FIG. 8 shows the above-mentioned polyline points A1, and the position mapping curve can be formed by linearly connecting adjacent polyline points A1, that is, the required position mapping curve can be formed by linearly connecting every two adjacent polyline points A1.

The step of linearly connecting the polyline points to form the position mapping curve may be executed by software. In order to achieve linear connection between the polyline points, firstly, a slope between adjacent polyline points is acquired. Since a floating-point operation is needed when software program processes decimals, software processing has a complicated procedure and occupies software program resources. However, the slope between adjacent polyline points inevitably appears a decimal, as shown in Table 5.

In Table 5, SlopeA2B represents a ratio of an ordinate difference value of every two adjacent polyline points A1 to an abscissa difference value of the every two adjacent polyline points A1, SlopeB2A represents a ratio of the abscissa difference value of the every two adjacent polyline points A1 to the ordinate difference value of the every two adjacent polyline points A1, SlopeA2B and SlopeB2A are reciprocal to each other, and both SlopeA2B and SlopeB2A can represent an inclination of a linear line between the every two adjacent polyline points A1. As can be seen from Table 5, the SlopeA2B and the SlopeB2A which are used to represent the slope between adjacent polyline points A1 are substantially decimals. In order to prevent the software program from performing the floating-point operation, the acquired slopes SlopeA2B and SlopeB2A may be multiplied by a setting multiple to acquire an integer slope. This embodiment of the present application does not limit a magnitude of the setting multiple, so long as the product of SlopeA2B and the setting multiple and the product of SlopeB2A and the setting multiple being an integer is ensured. For example, the setting multiple is set to 128

TABLE 5

Xat and Xbt corresponding to a screened polyline point

| Xat (Step) | Xbt (Step) | SlopeA2B | SlopeB2A | SlopeMagA2B | SlopeMagB2A |
|---|---|---|---|---|---|
| 0 | 0 | 1.01 | 0.99 | 129 | 127 |
| 120 | 121 | 3.48 | 0.29 | 445 | 37 |
| 143 | 201 | 4.00 | 0.25 | 512 | 32 |
| 161 | 273 | 6.50 | 0.15 | 832 | 20 |
| 175 | 364 | 6.17 | 0.16 | 789 | 21 |
| 181 | 401 | 7.43 | 0.13 | 951 | 17 |
| 188 | 453 | 5.67 | 0.18 | 725 | 23 |
| 191 | 470 | 2.40 | 0.42 | 307 | 53 |
| 216 | 530 | 2.79 | 0.36 | 357 | 46 |
| 249 | 622 | 2.25 | 0.44 | 288 | 57 |
| 253 | 631 | 2.00 | 0.50 | 256 | 64 |
| 269 | 663 | 1.67 | 0.60 | 213 | 77 |
| 281 | 683 | 1.15 | 0.87 | 147 | 111 |
| 301 | 706 | 0.68 | 1.46 | 88 | 187 |
| 320 | 719 | 0.41 | 2.43 | 53 | 311 |
| 371 | 740 | 0.10 | 10.00 | 13 | 1280 |
| 581 | 761 | 0.38 | 2.67 | 48 | 341 |
| 621 | 776 | 1.36 | 0.73 | 175 | 94 |
| 643 | 806 | 2.06 | 0.49 | 263 | 62 |
| 661 | 843 | 1.51 | 0.66 | 193 | 85 |
| 726 | 941 | 0.88 | 1.14 | 113 | 145 |
| 801 | 1007 | 0.66 | 1.50 | 85 | 193 |
| 977 | 1124 | 1.22 | 0.82 | 156 | 105 |
| 1000 | 1152 | 0.00 | 0.00 | 0 | 0 | herein, an integer multiple SlopeMagA2B corresponding to SlopeA2B in Table 5 and an integer multiple SlopeMagB2A corresponding to SlopeB2A in Table 5 are obtained, and abscissas Xat and ordinates Xbt of the polyline points, and the integer multiples SlopeMagA2B and SlopeMagB2A shown in Table 5 are all stored in the software program, and the software program is burned into the electric valve.

After the integer slopes are acquired, a section between adjacent polyline points may be linearly interpolated according to the integer slopes. For example, coordinates of adjacent polyline points are (0, 0) and (120, 121), respectively, and the section between the two polyline points may be linearly interpolated according to the integer slope between the two polyline points, so as to obtain a value of the actual position Xbt of the electric valve corresponding to the required position Xat of the electric valve of each step between step 0 and step 120, Xat of each step between step 0 and step 120 and Xbt corresponding to Xat of the each step are respectively taken as the abscissa and ordinate, such that a plurality of interpolation points between every two adjacent polyline points are formed. The polyline points and the interpolation points form a plurality of linear coordinate points, and a difference value between the required positions of the electric valve corresponding to adjacent linear coordinate points is 1 step, that is, after the linear interpolation, the value of Xbt corresponding to Xat of the each step on the curve shown in FIG. 8 can be obtained, and the position mapping curve can be formed by linearly connecting all the linear coordinate points.

In this way, the position mapping curve shown in FIG. 8 is obtained by using the linear interpolation method. The software program only needs to deal with the linear calculation of the polyline points and the linear calculation among the polyline points, and does not need to perform massive amounts of processing on Xat of the each step and the coordinate point of Xbt corresponding to Xat of the each step on the position mapping curve, thereby greatly reducing the software program processing quantity and the working time of the software program, and reducing the probability of error occurring in the process of the software program processing. In addition, the position mapping curve shown in FIG. 8 is only a curve obtained by performing second derivative processing on the curve shown in FIG. 6 and linearly connecting the adjacent polyline points, such that the position mapping curve shown in FIG. 8 is similar to the curve shown in FIG. 6. Therefore, according to the position mapping curve shown in FIG. 8, the setting actual position corresponding to the position required by the user is obtained, and the electric valve is controlled to run to the setting actual position, thereby greatly reducing the software program processing quantity and the working time of the software program, and reducing the probability of error occurring in the process of the software program processing.

Meanwhile, compared with the process of controlling the electric valve according to the principle that the total stroke of the electric valve is consistent, the difference between the flow rate corresponding to the actual position of the electric valve and the flow rate corresponding to the required position of the electric valve can also be reduced, thereby improving the accuracy of flow rate control of the electric valve.

In step S205, a setting required position is acquired according to the required setting parameter and the required setting parameter curve, and the setting actual position is acquired according to the setting required position and the position mapping curve.

In step S206, the electric valve is controlled to run toward the setting actual position of the electric valve.

Figure 9:
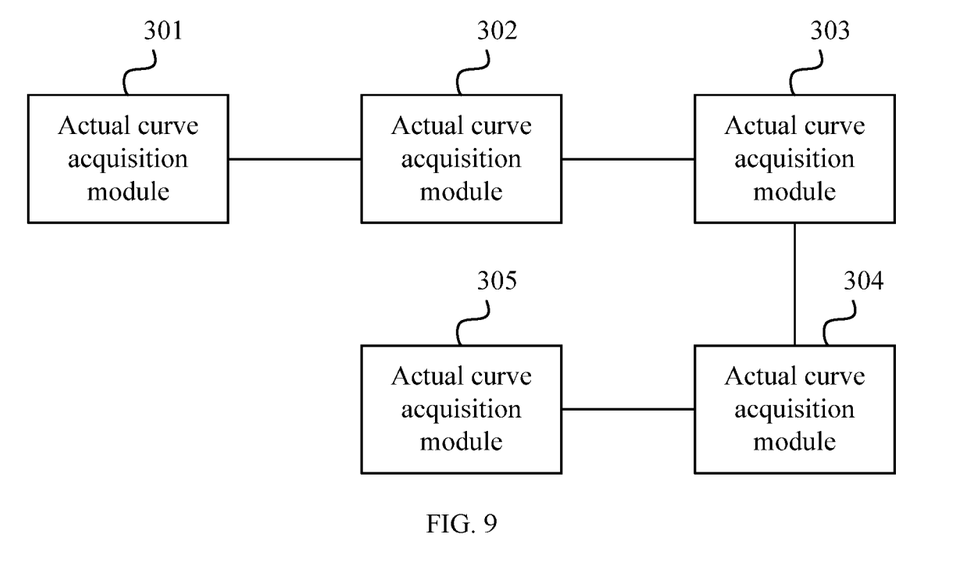
FIG. 9 is a block diagram of a control system according to an embodiment of the present application.

An embodiment of the present application further provides a control system for controlling an electric valve. FIG. 9 is a block diagram of a control system according to an embodiment of the present application. As shown in FIG. 9, the control system includes an actual curve acquisition module 301, a required curve acquisition module 302, a fitting module 303, an actual position acquisition module 304 and an electric valve control module 305. The actual curve acquisition module 301 is configured to acquire an actually measured setting parameter curve. The required curve acquisition module 302 is configured to acquire a required setting parameter curve. Both the actually measured setting parameter curve and the required setting parameter curve include a corresponding relationship between a position of the electric valve and a setting parameter. The fitting module 303 is configured to fit the actually measured setting parameter curve and the required setting parameter curve to acquire a position mapping curve. The position mapping curve represents a corresponding relationship between an actual position of the electric valve and a required position of the electric valve, and a difference value between a setting parameter corresponding to an abscissa of each coordinate point on the position mapping curve and a setting parameter corresponding to an ordinate of the each coordinate point on the position mapping curve is less than a setting difference value. The actual position acquisition module 304 is configured to acquire a setting required position according to a required setting parameter and the required setting parameter curve, and acquire a setting actual position according to the setting required position and the position mapping curve. The electric valve control module 305 is configured to control the electric valve to run toward the setting actual position of the electric valve.

The control system provided by the embodiment of the present application also avoids a situation that the control accuracy of the setting parameter has a large deviation, thus improving the accuracy of the control process of the electric valve. The control system provided by the embodiment of the present application can execute the control method provided by the above-mentioned embodiments.

In a third embodiment, the control method is used for controlling the electric valve. The control method includes steps described below. A setting required position is acquired according to a required setting parameter and a required setting parameter curve, and a setting actual position is acquired according to the setting required position and a position mapping curve. The electric valve is controlled to run toward the setting actual position of the electric valve. The position mapping curve is pre-stored in a control system used for controlling running of the electric valve, the position mapping curve varies with an actually measured setting parameter curve and the required setting parameter curve, and both the actually measured setting parameter curve and the required setting parameter curve represent a corresponding relationship between a position of the electric valve and a setting parameter. The position mapping curve is obtained by fitting the actually measured setting parameter curve and the required setting parameter curve, and a difference value between the setting parameter corresponding to an abscissa of a point on the position mapping curve and the setting parameter corresponding to an ordinate of the point on the position mapping curve is less than a setting difference value.

Compared with the embodiments of the first control method and the second control method, a main difference of the third control method is described below. The position mapping curve is pre-stored in the control system used for controlling running of the electric valve, and the position mapping curve varies with the actually measured setting parameter curve and the required setting parameter curve. Under the condition that the actually measured setting parameter curve and the required setting parameter curve are unchanged, the process of acquiring the position mapping curve by the first control method and the second control method does not need to be performed, which is beneficial to mass production. In this way, the control method is simpler, and the control system requires less space. Under the condition that the actually measured setting parameter curve and the required setting parameter curve change, the position mapping curve can be changed on-line or off-line, where an on-line correction mode is the same as the first control method and the third control method, and an off-line correction mode is the same as the third control method. The on-line refers to on the production line, and the off-line refers to after the completion of production.

An embodiment of the present application further provides a second control system for controlling the electric valve. The control system includes an actual position acquisition module, an electric valve control module and a storage module. The actual position acquisition module is configured to acquire a setting required position according to a required setting parameter and a required setting parameter curve, and acquire a setting actual position according to the setting required position and a position mapping curve. The electric valve control module is configured to control the electric valve to run toward the setting actual position of the electric valve. The storage module is configured to store the position mapping curve. The position mapping curve varies with an actually measured setting parameter curve and the required setting parameter curve, and both the actually measured setting parameter curve and the required setting parameter curve include a corresponding relationship between a position of the electric valve and a setting parameter. The position mapping curve is obtained by fitting the actually measured setting parameter curve and the required setting parameter curve, and a difference value between a setting parameter corresponding to an abscissa of a point on the position mapping curve and a setting parameter corresponding to an ordinate of the point on the position mapping curve is less than a setting difference value.

Compared with the first control system, a main difference of the second control system is described below. Under the condition that the actually measured setting parameter curve and the required setting parameter curve are unchanged, the process of acquiring the position mapping curve by the first control method and the second control method does not need to be performed, that is, the actual curve acquisition module, the required curve acquisition module and the fitting module are not needed, while the storage module storing the position mapping curve is required to store the position mapping curve. Under the condition that the actually measured setting parameter curve and the required setting parameter curve are unchanged, the process of acquiring the position mapping curve by the first control method and the second control method does not need to be performed, which is beneficial to mass production. Under the condition that the actually measured setting parameter curve and the required setting parameter curve change, the position mapping curve can be changed on-line or off-line, where the on-line correction mode is the same as the first control system, and the off-line correction mode is the same as the second control system.

Figure 10:
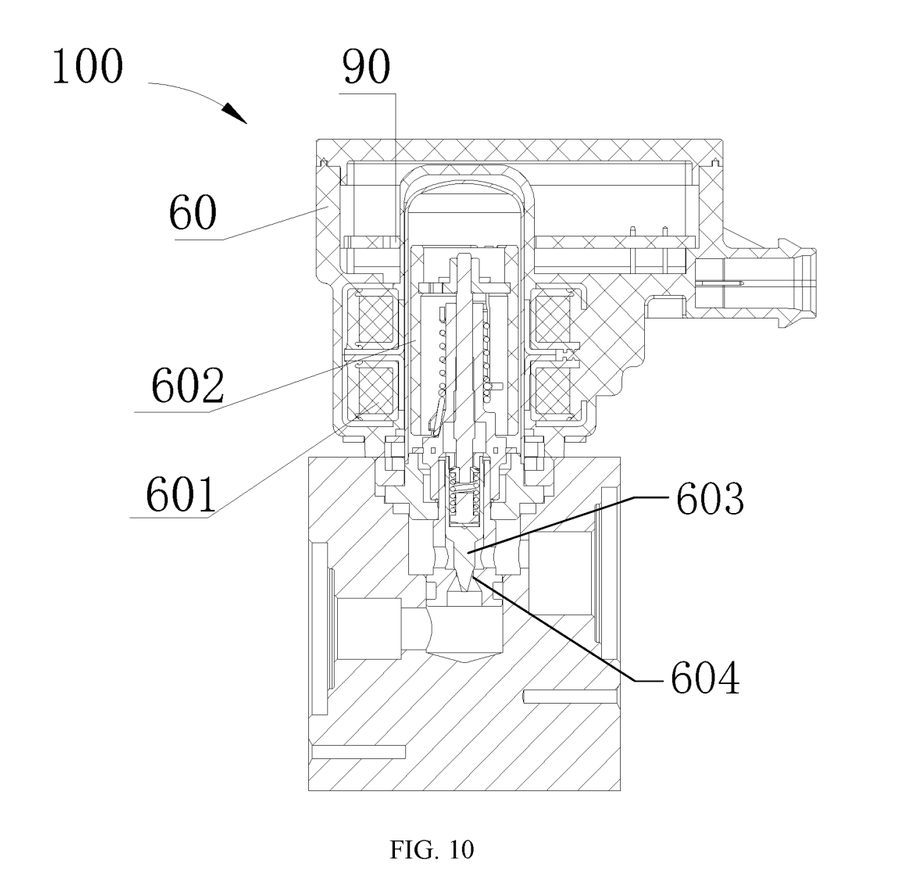
FIG. 10 is a structure diagram of an electric valve according to an embodiment of the present application.

An embodiment of the present application further provides an electric valve. FIG. 10 is a structure diagram of an electric valve according to an embodiment of the present application. As shown in FIG. 10, the electric valve 100 includes a housing 60, a stator assembly 601, a rotor assembly 602, a spool 603, and a circuit board assembly 90. The circuit board assembly 90 is disposed in an inner cavity formed by the housing 60. The stator assembly 601 is disposed on a periphery of the rotor assembly 602, and the rotor assembly 602 and the stator assembly 601 constitute a stepping motor in the electric valve 100. The stator assembly 601 includes a coil, the rotor assembly 602 includes a permanent magnet, and the coil is electrically connected to the circuit board assembly 90. The coil generates an excitation magnetic field after being energized, the rotor assembly 602 rotates in the excitation magnetic field, and the stepping motor drives the spool 603 of the electric valve to move relative to a valve port 604 so as to cause the valve port 604 to reach a corresponding opening degree. A position of the spool 603 is a position of the electric valve. The circuit board assembly 90 is integrated with the control system (not shown in FIG. 10) of the above-mentioned embodiments.

The embodiments of the present application provide the control method, the control system and the electric valve. The control method includes the steps described below. The actually measured setting parameter curve and the required setting parameter curve are acquired, and both the actually measured setting parameter curve and the required setting parameter curve include the corresponding relationship between the position of the electric valve and the setting parameter. The actually measured setting parameter curve and the required setting parameter curve are fitted, so as to acquire the position mapping curve including the corresponding relationship between the actual position of the electric valve and the required position of the electric valve. The difference value between the setting parameter corresponding to the abscissa of the each coordinate point on the position mapping curve and the setting parameter corresponding to the ordinate of the each coordinate point on the position mapping curve is less than the setting difference value, and the setting difference value may be set to be zero or to be a value tending to zero, such that the abscissa and the ordinate of the coordinate point on a final obtained position mapping curve, that is, the setting parameter corresponding to the required position of the electric valve and the setting parameter corresponding to the actual position of the electric valve, are the same as or close. The setting actual position corresponding to the setting required position and on the position mapping curve is queried according to the setting required position, and then the electric valve is controlled to run toward the setting actual position of the electric valve. In this way, the actual setting parameter of the electric valve can reach the setting parameter required by the user or is very close to the setting parameter required by the user, thereby avoiding the situation that the control accuracy of the setting parameter has the large deviation, and improving the accuracy of the control process of the electric valve.

What is claimed is:

1. A control method for controlling an electric valve, wherein the control method comprises:
    acquiring an actually measured setting parameter curve;
    acquiring a required setting parameter curve, wherein both the actually measured setting parameter curve and the required setting parameter curve represent a corresponding relationship between a position of the electric valve and a setting parameter;

fitting the actually measured setting parameter curve and the required setting parameter curve to acquire a position mapping curve, wherein the position mapping curve represents a corresponding relationship between an actual position of the electric valve and a required position of the electric valve, and a difference value between a setting parameter corresponding to an abscissa of each coordinate point on the position mapping curve and a setting parameter corresponding to an ordinate of the each coordinate point on the position mapping curve is less than a setting difference value;

obtaining a setting required position according to a required setting parameter and the required setting parameter curve, and acquiring a setting actual position according to the setting required position and the position mapping curve; and controlling the electric valve to run toward the setting actual position of the electric valve.

2. The control method of claim 1, wherein the fitting the actually measured setting parameter curve and the required setting parameter curve to acquire the position mapping curve comprises:

acquiring a coordinate point actual position of the electric valve corresponding to a coordinate point setting parameter on the actually measured setting parameter curve, according to the actually measured setting parameter curve and the coordinate point setting parameter;

acquiring a coordinate point required position of the electric valve corresponding to the coordinate point setting parameter on the required setting parameter curve, according to the required setting parameter curve and the coordinate point setting parameter; and taking a coordinate point actual position corresponding to a same coordinate point setting parameter as an ordinate, and a coordinate point required position corresponding to the same coordinate point setting parameter as an abscissa to form a coordinate point corresponding the same coordinate point setting parameter, and smoothly connecting coordinate points corresponding to different coordinate point setting parameters to form the position mapping curve; wherein an abscissa and an ordinate of the each coordinate point on the position mapping curve correspond to a same setting parameter.

3. The control method of claim 1, wherein the fitting the actually measured setting parameter curve and the required setting parameter curve to acquire the position mapping curve comprises:

fitting the actually measured setting parameter curve and the required setting parameter curve to acquire a middle position mapping curve, wherein the middle position mapping curve represents the corresponding relationship between the actual position of the electric valve and the required position of the electric valve, and an abscissa and an ordinate of each coordinate point on the middle position mapping curve correspond to a same setting parameter; and acquiring a plurality of polyline points according to a second derivative of adjacent coordinate points on the middle position mapping curve, and linearly connecting adjacent polyline points of the plurality of polyline points to form the position mapping curve.

4. The control method of claim 3, wherein the fitting the actually measured setting parameter curve and the required setting parameter curve to acquire the middle position mapping curve comprises:

acquiring a coordinate point actual position of the electric valve corresponding to a coordinate point setting parameter on the actually measured setting parameter curve, according to the actually measured setting parameter curve and the coordinate point setting parameter;

acquiring a coordinate point required position of the electric valve corresponding to the coordinate point setting parameter on the required setting parameter curve, according to the required setting parameter curve and the coordinate point setting parameter; and taking a coordinate point actual position corresponding to a same coordinate point setting parameter as an ordinate, and a coordinate point required position corresponding to the same coordinate point setting parameter as an abscissa to form a coordinate point corresponding to the same coordinate point setting parameter, and smoothly connecting coordinate points corresponding to different coordinate point setting parameters to form the middle position mapping curve.

5. The control method of claim 3, wherein the acquiring the plurality of polyline points according to the second derivative of the adjacent coordinate points on the middle position mapping curve comprises:

calculating a second derivative of a latter coordinate point of every two adjacent coordinate points on the middle position mapping curve, and screening out a coordinate point where an absolute value of a second derivative of coordinate point is greater than a setting value as a polyline point.

6. The control method of claim 3, wherein the linearly connecting the adjacent polyline points of the plurality of polyline points to form the position mapping curve comprises:

acquiring a slope between the adjacent polyline points, and multiplying the acquired slope by a setting multiple to acquire an integer slope;

performing linear interpolation on a section between the adjacent polyline points according to the integer slope, wherein the plurality of polyline points and interpolation points form a plurality of linear coordinate points; and linearly connecting all the plurality of linear coordinate points to form the position mapping curve.

7. The control method of claim 1, wherein the electric valve comprises an electronic expansion valve, the electronic expansion valve comprises a spool, the setting parameter comprises a flow rate, and both the actually measured setting parameter curve and the required setting parameter curve represent a corresponding relationship between a position of the spool and the flow rate.

8. The control method of claim 7, wherein the electronic expansion valve further comprises a motor, the position of the spool is determined by a microstep value of the motor, the actually measured setting parameter curve and the required setting parameter curve further represent a corresponding relationship between the microstep value of the motor and the flow rate, and the electronic expansion valve is configured to run toward the setting actual position by adjusting the microstep value of the motor.

9. A control system for controlling an electric valve, wherein the control system comprises:

an actual curve acquisition module, configured to acquire an actually measured setting parameter curve;

a required curve acquisition module, configured to acquire a required setting parameter curve, wherein both the actually measured setting parameter curve and the required setting parameter curve represent a corresponding relationship between a position of the electric valve and a setting parameter;

a fitting module, configured to fit the actually measured setting parameter curve and the required setting parameter curve to acquire a position mapping curve, wherein the position mapping curve represents a corresponding relationship between an actual position of the electric valve and a required position of the electric valve, and a difference value between a setting parameter corresponding to an abscissa of each coordinate point on the position mapping curve and a setting parameter corresponding to an ordinate of the each coordinate point on the position mapping curve is less than a setting difference value;

an actual position acquisition module, configured to obtain a setting required position according to a required setting parameter and the required setting parameter curve, and acquire a setting actual position according to the setting required position and the position mapping curve; and an electric valve control module, configured to control the electric valve to run toward the setting actual position of the electric valve.

10. An electric valve, comprising a stator assembly, a rotor assembly, a spool and a circuit board assembly, wherein the stator assembly comprises a coil, the rotor assembly comprises a permanent magnet, the coil is electrically connected to the circuit board assembly, the coil is configured to generate an excitation magnetic field after being energized, the rotor assembly is configured to rotate in the excitation magnetic field, a position of the spool is a position of the electric valve, and the circuit board assembly is integrated with the control system of claim 9.

* * * * *